(12) United States Patent
Yao

(10) Patent No.: US 11,158,214 B2
(45) Date of Patent: Oct. 26, 2021

(54) RESTICKABLE LETTERING FILM AND MANUFACTURING METHOD THEREOF

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 118 days.

(21) Appl. No.: 16/510,603

(22) Filed: Jul. 12, 2019

(65) Prior Publication Data

US 2020/0020254 A1 Jan. 16, 2020

(30) Foreign Application Priority Data

Jul. 16, 2018 (TW) .................................. 107124548

(51) Int. Cl.
| | |
|---|---|
| *G09F 3/10* | (2006.01) |
| *B32B 7/027* | (2019.01) |
| *C09J 7/35* | (2018.01) |
| *C09J 7/22* | (2018.01) |
| *C09J 5/06* | (2006.01) |
| *B44C 1/17* | (2006.01) |
| *B44C 1/16* | (2006.01) |
| *B32B 7/12* | (2006.01) |

(52) U.S. Cl.
CPC ................ *G09F 3/10* (2013.01); *B32B 7/027* (2019.01); *B32B 7/12* (2013.01); *B44C 1/162* (2013.01); *B44C 1/1712* (2013.01); *C09J 5/06* (2013.01); *C09J 7/35* (2018.01); *C09J 7/22* (2018.01); *C09J 2301/304* (2020.08); *Y10T 428/14* (2015.01)

(58) Field of Classification Search
CPC ........ G09F 3/10; C09J 7/35; C09J 7/22; C09J 5/06; C09J 2301/304; B32B 7/027; B32B 7/12; B44C 1/162; B44C 1/1712; Y10T 428/14
See application file for complete search history.

(56) References Cited

U.S. PATENT DOCUMENTS

| | | | | |
|---|---|---|---|---|
| 5,026,584 A | * | 6/1991 | Logan .................... | B44C 1/105 428/40.2 |
| 5,338,612 A | * | 8/1994 | Kawaguchi ........ | B41M 5/38214 428/209 |
| 5,441,785 A | * | 8/1995 | Liebe, Jr. ................ | B44C 1/162 156/230 |

(Continued)

FOREIGN PATENT DOCUMENTS

| | | |
|---|---|---|
| TW | I280854 B | 5/2007 |
| TW | M375609 U1 | 3/2010 |

*Primary Examiner* — Patricia L. Nordmeyer
(74) *Attorney, Agent, or Firm* — Guice Patents PLLC

(57) ABSTRACT

The present invention provides a restickable lettering film and a manufacturing method thereof. The manufacturing method of the restickable lettering film includes steps of: preparing a lettering layer having a first surface and a second surface; disposing a thermo-bonding layer on the second surface of the lettering layer; adhering the first surface of the lettering layer to a temporary adhesive layer. The lettering layer can be many times repeatedly removed from and adhered to the temporary adhesive layer. Accordingly, a user can easily use the lettering film.

9 Claims, 6 Drawing Sheets

(56) References Cited

U.S. PATENT DOCUMENTS

| | | | |
|---|---|---|---|
| 2007/0231525 A1* | 10/2007 | Bodwell | B32B 27/22 428/40.1 |
| 2015/0140275 A1* | 5/2015 | Abrams | B32B 7/12 428/161 |
| 2015/0217532 A1 | 8/2015 | Kuraseko et al. | |
| 2018/0114469 A1 | 4/2018 | Yao | |
| 2018/0320030 A1 | 11/2018 | Yao | |

* cited by examiner

RESTICKABLE LETTERING FILM AND MANUFACTURING METHOD THEREOF

BACKGROUND OF THE INVENTION

Field of the Invention

The present invention relates generally to an adherent film, and more particularly to a lettering film that can be cut into patterns and the manufacturing method thereof. The lettering layer of the lettering film can be repeatedly adhered and located.

Description of the Related Art

It is known that patterns can be formed on the surface of a fabric such as a clothes or a trousers by means of screen printing or embroidery. The above methods can be performed only in a factory or a site with special equipments, a consumer can hardly DIY form patterns (figures or characters) on the surface of a fabric. The inventor's patent application Ser. No. 16/019,170 discloses a cutting plotter film having a character film layer for a consumer to DIY cut a desired pattern. The hot melt adhesive of the cutting plotter film can be heated and molten by a heating apparatus so as to adhere the character film layer to a fabric, accordingly, the pattern of the cutting plotter film can be presented on the fabric. In order to facilitate use, a release film is attached to a surface of the character film layer, after the character film layer is adhered to the fabric, the release film is removed and separated from the character film layer.

In the cutting plotter film of the above patent application, the character film layer is formed and attached to the release film, which has a release property, when the character film layer is separated from the release film, it is impossible to attach the character film layer back to the release film again. A consumer can cut the cutting plotter film into a pattern and remove the part excluding the pattern from the release film so as to adhere the pattern to the fabric. However, when removing the part excluding the pattern from the release film, it often takes place that a part of the pattern is also incautiously removed from the release film, in this case, it is impossible to adhere the separated part of the pattern back to the release film. As a result, the pattern is incomplete and the entire cutting plotter film will become useless. Especially in case of a complicated and fine pattern, the pattern of the character film layer is so easy to detach from the release film. This leads to inconvenience in use of the cutting plotter film. The inventor has therefore invented the present invention in order to improve the above disadvantage.

SUMMARY OF THE INVENTION

It is therefore a primary object of the present invention to provide a restickable lettering film. Before thermally bonded to an article, the lettering layer of the lettering film can be repeatedly adhered and located.

It is a further object of the present invention to provide the above restickable lettering film. Even if the pattern cut from the lettering film is detached, the pattern can be repeatedly adhered back to recover the complete pattern, a consumer can conveniently DIY cut the lettering film into a desired pattern to use.

To achieve the above and other objects, the manufacturing method of the restickable lettering film of the present invention includes steps of:

preparing a lettering layer having a first surface and a second surface;

disposing a thermo-bonding layer on the second surface of the lettering layer;

preparing a temporary adhesive layer, the temporary adhesive layer having an adhesive surface, which is repeatedly stickable; and adhering the first surface of the lettering layer to the adhesive surface of the temporary adhesive layer.

By the manufacturing method above-mentioned, the restickable lettering film of the present invention includes:

a temporary adhesive layer, the temporary adhesive layer having an adhesive surface, which is restickable without residual adhesive;

a lettering layer, the first surface of the lettering layer being adhered to the adhesive surface of the temporary adhesive layer, the lettering layer can be repeatedly removed from and adhered to the temporary adhesive layer;

a thermo-bonding layer disposed on the second surface of the lettering layer.

As a result, the restickable lettering film is formed, the first surface of the lettering layer is adhered to the temporary adhesive layer, while the thermo-bonding layer disposed on the second surface of the lettering layer. A user can cut the lettering film into a pattern, the cutting depth of the pattern is such that the lettering layer and the thermo-bonding layer are cut off, the cut pattern can be repeatedly removed from and adhered to the temporary adhesive layer and located thereby.

Preferably, the first surface of the lettering layer is formed with stripes.

In the restickable lettering film of the present invention and the manufacturing method of the lettering film, the lettering layer can be repeatedly adhered to the temporary adhesive layer. Therefore, even if the pattern of the lettering layer is detached before thermally bonded, the use of the lettering film still will not be affected, the pattern of the lettering layer can be still adhered back to the temporary adhesive layer to keep the pattern complete.

The present invention can be best understood through the following description and accompanying drawings, wherein:

DETAILED DESCRIPTION OF THE PREFERRED EMBODIMENTS

Figure 2:
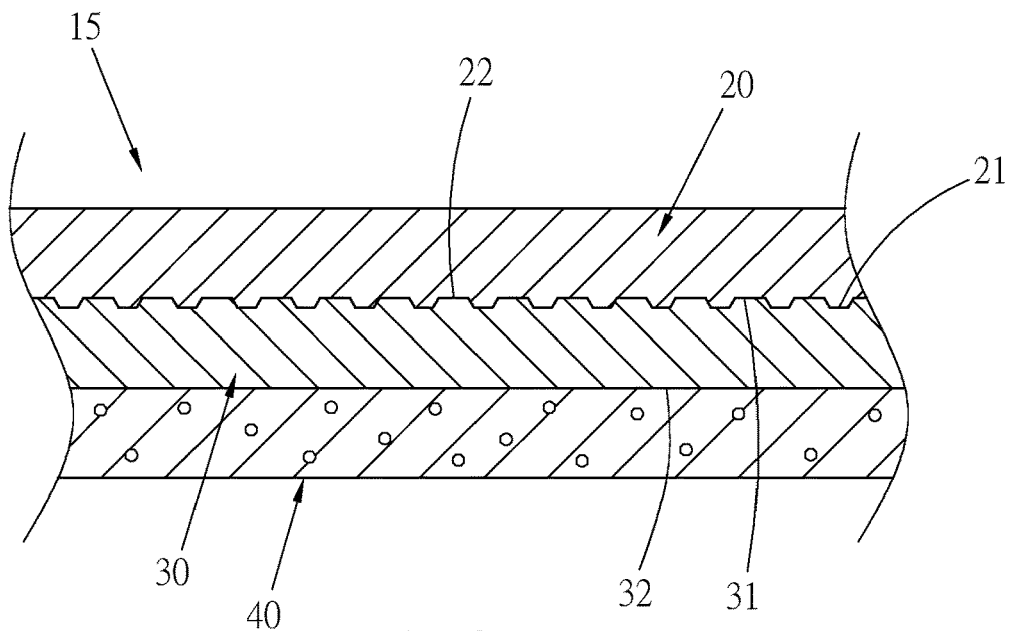
FIG. 2 is a sectional view of a pre-product of a preferred embodiment of the lettering film of the present invention.
Figure 4:
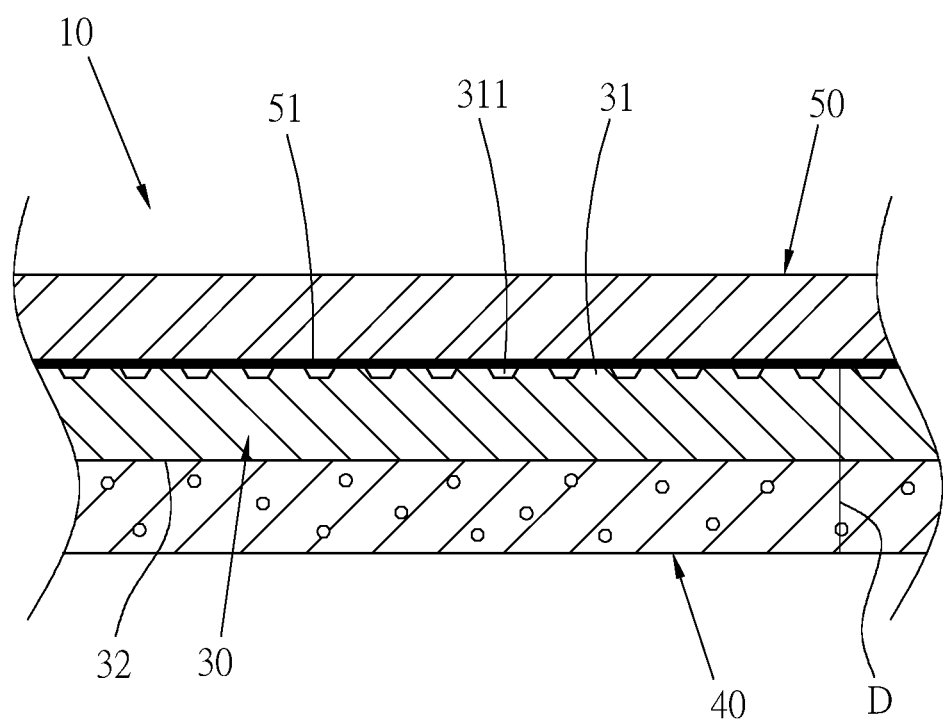
FIG. 4 is a sectional view showing that a temporary adhesive layer is adhered to the lettering layer to form the lettering film of the present invention.
Figure 5:
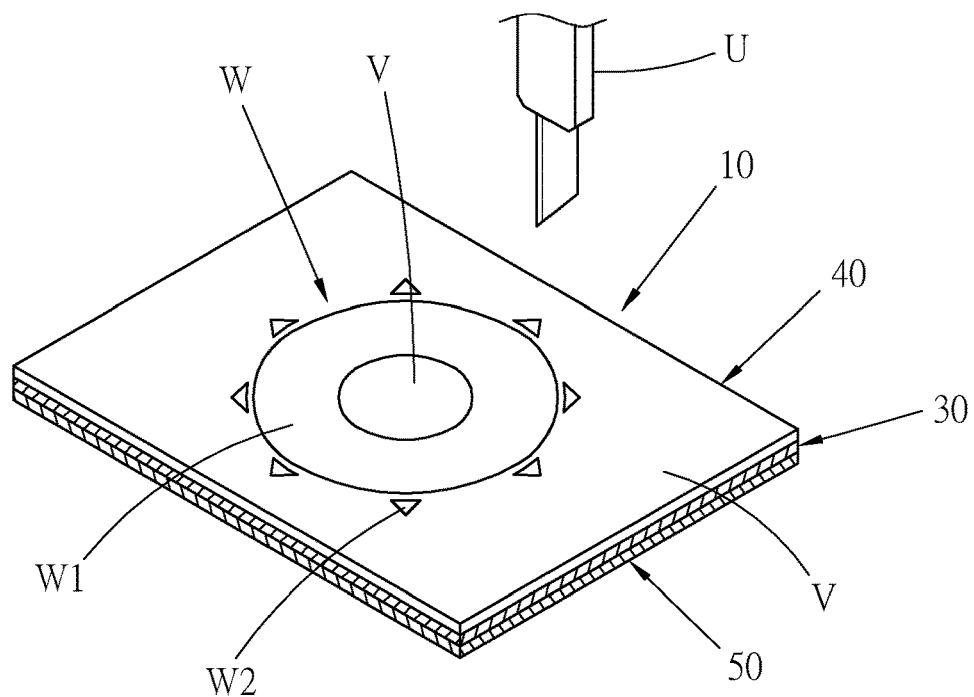
FIG. 5 is a perspective view of the lettering film of the present invention, in which the lettering film is cut into a pattern.

Please refer to FIGS. 4 and 5, which show the lettering film 10 provided by a preferred embodiment of the present invention. As shown in FIG. 2, in the manufacturing method of the lettering film 10, a pre-product 15 of the lettering film 10 is first manufactured and then the lettering film 10 of the present invention is manufactured from the pre-product 15. The lettering film 10 is for a consumer to cut one or more patterns, the patterns are then thermally stuck onto an article by means of a heating apparatus.

Figure 1:
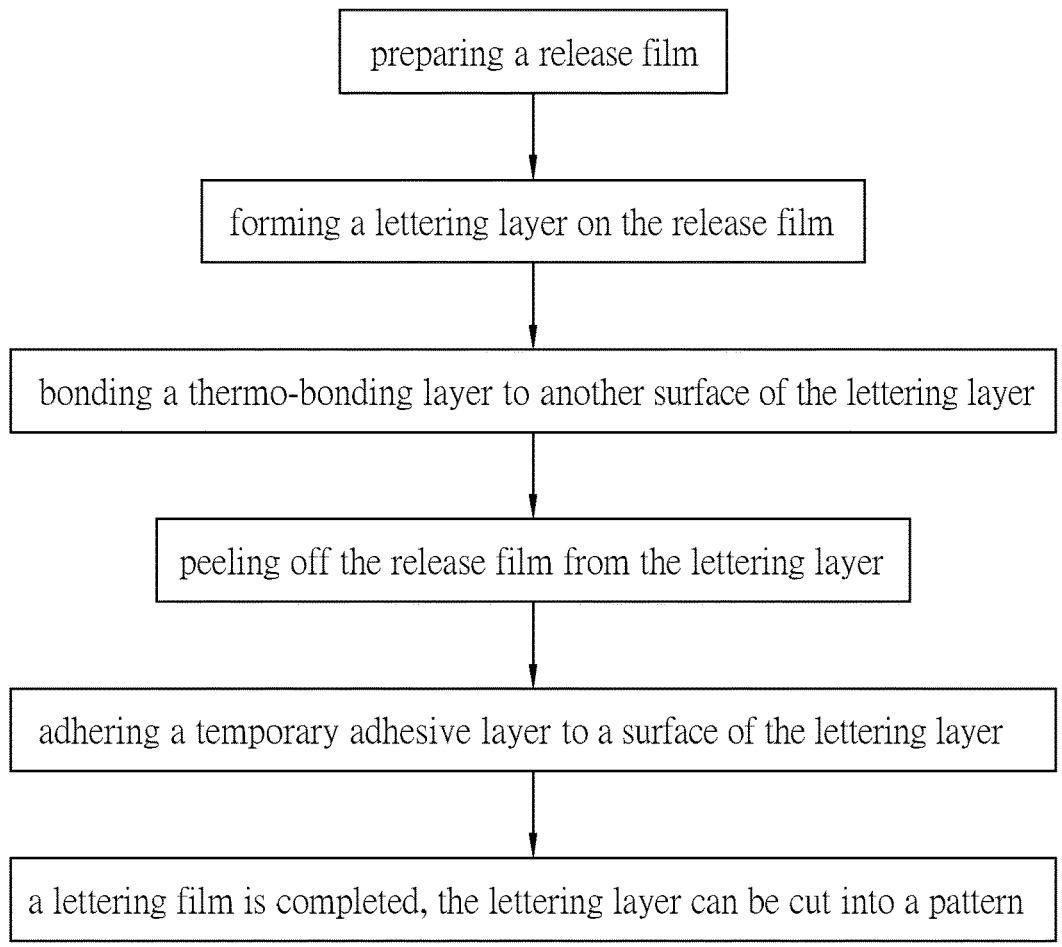
FIG. 1 is a flow chart of a preferred embodiment of the manufacturing method of the lettering film of the present invention.
Figure 3:
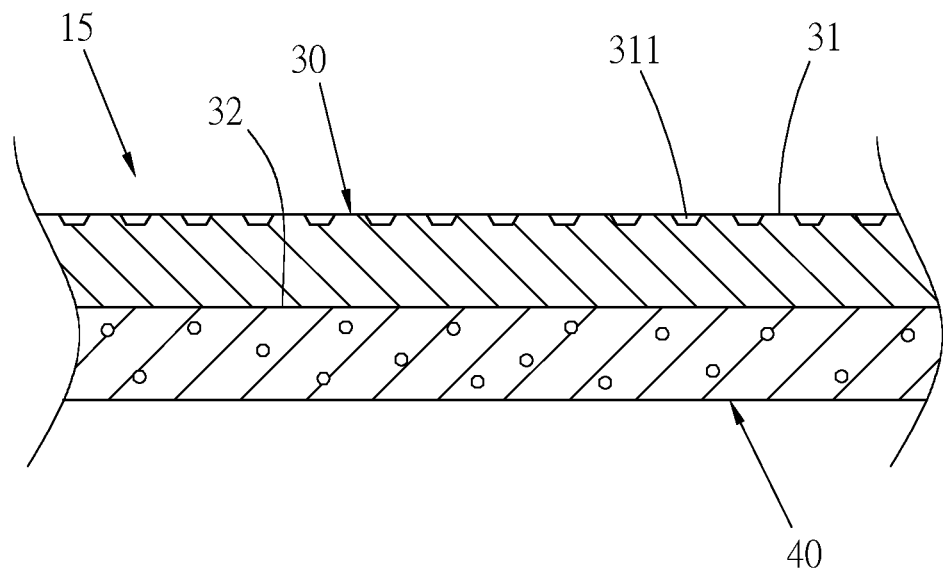
FIG. 3 is a sectional view according to FIG. 2, in which the release film of the pre-product is removed.
Figure 9:
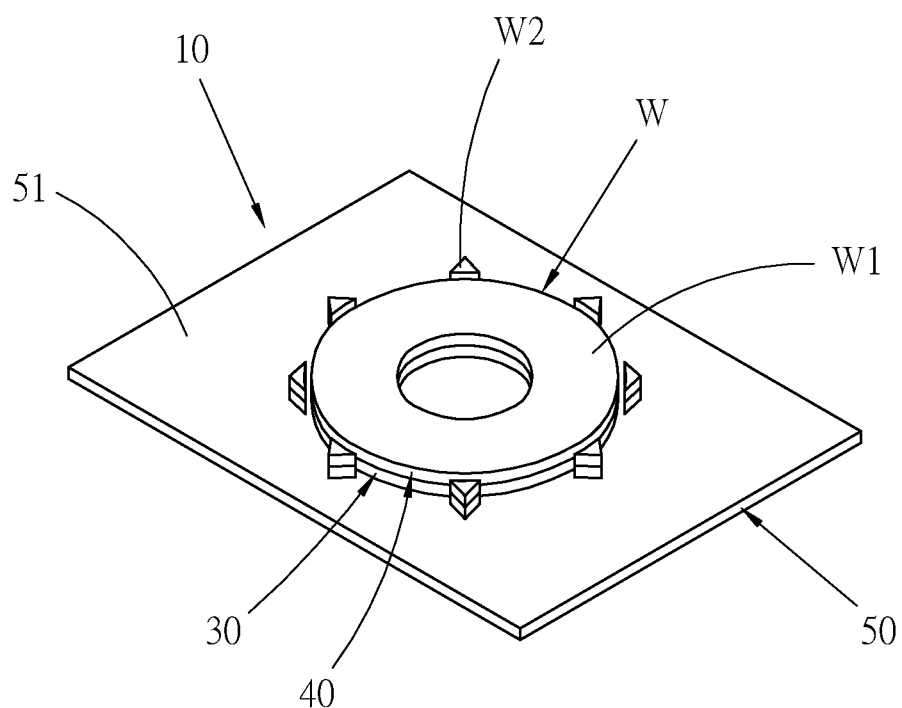
FIG. 9 is a perspective view showing that the complete pattern is adhered to the temporary adhesive layer.
Figure 10:
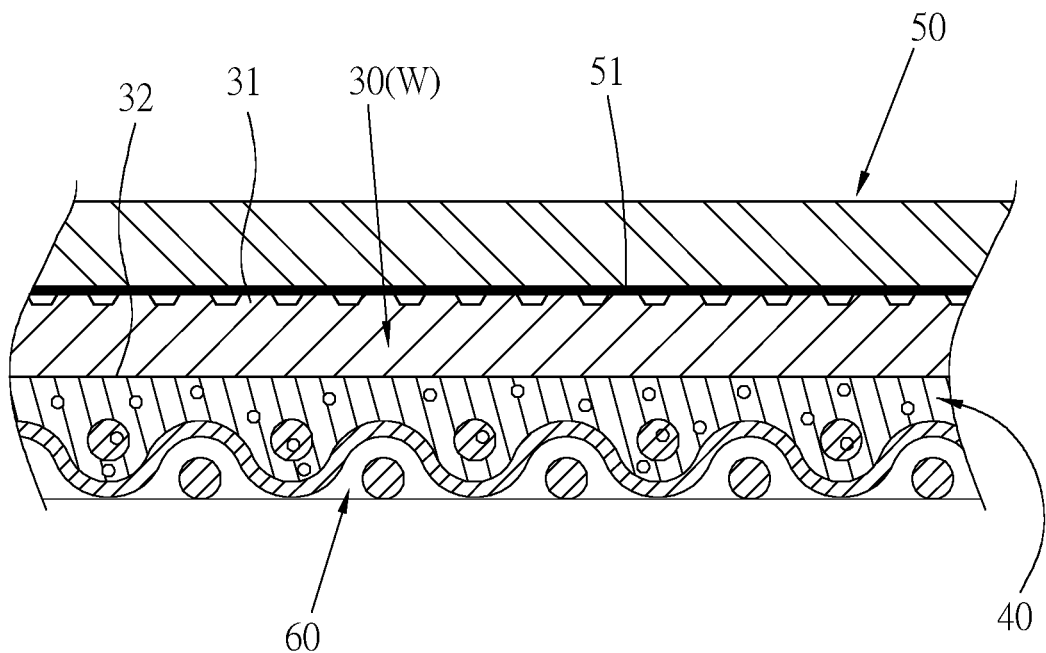
FIG. 10 is a sectional view showing that the pattern of the lettering film is adhered to an article.

Please refer to FIGS. 1 and 2, the pre-product 15 has a release carrier body. In this embodiment, the release carrier body is a release film 20. A lettering layer 30 and a thermo-bonding layer 40 are sequentially disposed on the release film 20. Referring to FIG. 3, the release film 20 is removed from the surface of the lettering layer 30, then, as shown in FIG. 4, a temporary adhesive layer 50 with an adhesive surface is attached to the lettering layer 30 to form the lettering film 10 of the present invention. Thereafter, the lettering film 10 can be cut into various figures or characters (such as the pattern W as shown in FIG. 5 for illustration purposes). For example, a user can DIY cut the lettering film 10 into a desired pattern W (a figure or a character) and then remove the unnecessary part V and then adhere the pattern W onto the surface of an article 60 (such as clothes, bag or shoes). As shown in FIG. 9, the lettering film 10 has been cut into the pattern W and the unnecessary part V has been removed. Then the lettering film 10 is heated by a heating apparatus (such as an electrical iron or an ironing press) to adhere onto an article 60. FIG. 10 shows that the pattern W of the lettering film is adhered to the article 60. The lettering layer 30 of the present invention can be repeatedly adhered to the temporary adhesive layer 50, therefore, even if the user incautiously peels off the lettering layer 30 from the temporary adhesive layer 50, the user can re-adhere the lettering layer 30 to the temporary adhesive layer 50, this can avoid affection on the completeness of the pattern and failure to work.

Please refer to FIGS. 1 and 2, the pre-product 15 is a multilayered structure including a release carrier body, which is a release film 20, a lettering layer 30 and a thermo-bonding layer 40. It should be noted that with respect to the product of the lettering film 10 or the pre-product 15, the lettering layer 30 and the thermo-bonding layer 40 have a quite thin thickness, in the drawings, the release film 20, the lettering layer 30 and the thermo-bonding layer 40 are shown with an apparent thickness for illustration purposes, the thickness shown in the drawings is not the actual thickness of the lettering film 10 or the pre-product 15.

The structure and the manufacturing method of the lettering film are described hereinafter. Please refer to FIG. 2, the release film 20 is first prepared, which is a releasable plastic film. The release carrier body alternatively can be any other releasable carrier body. In this embodiment, a surface of the release film 20 is an embossed surface 22 with stripes or recessed/raised stripes 21. The stripes or recessed/raised stripes 21 of the embossed surface 22 can be regular or irregular or specially designed stripes. The stripes 21 can be fully or partially or specially arranged on the embossed surface 22. The stripes of the embossed surface 22 can be made by means of plate making or laser engraving. The structure, the form and the forming method of the stripes can be achieved by different designs and manufacturing methods and are not limited to what shown in this embodiment. In this embodiment, the embossed surface 22 is formed by means of laser engraving. The release film 20 can be releasable itself or a release agent is coated on the embossed surface 22 to achieve the release effect.

After the release film 20 is prepared, the lettering layer 30 is formed on the embossed surface 22 of the release film 20. In this embodiment, the material of the lettering layer 30 is plastic material such as polyurethane (PU), thermoplastic polyurethane (TPU) or natural rubber or silicone. In practice, the plastic material such as liquid polyurethane (PU) or thermoplastic polyurethane (TPU) or natural rubber or silicone can be coated onto the surface of the release film 20 and shaped into the lettering layer 30, whereby the lettering layer 30 is disposed on the release film 20. When the lettering layer 30 is formed on the release film 20, a first surface 31 of the lettering layer 30 contacts the embossed surface 22 of the release film 20, whereby stripes 311 are produced on the first surface 31 as a mirror image of the stripes 21 of the embossed surface 22. The stripes 311 are bare-eye visible stripes capable of providing recognition and anti-counterfeit effect. The stripes 311 are a mirror image of the stripes 21 of the embossed surface 22 so that the stripes 311 of this embodiment are also as laser-formed stripes. When observed by different angles, the stripes 311 produce different light reflection effects. It should be noted that the first surface 31 of the lettering layer 30 can be made with the stripes or without any stripe.

After the lettering layer 30 is shaped, the thermo-bonding layer 40 is coated or disposed on the other surface, that is, a second surface of the lettering layer 30. The thermo-bonding layer 40 is hot melt adhesive, which is adhesive after heated. Accordingly, the pre-product 15 is completely manufactured.

Please refer to FIG. 3. After the lettering layer 30 and the thermo-bonding layer 40 of the pre-product 15 are shaped, the lettering film 10 can be manufactured. The release film 20 is peeled off from the lettering layer 30, whereby the release film 20 is separated from the first surface 31 of the lettering layer 30. Please refer to FIG. 4, a temporary adhesive layer 50 with an adhesive surface is prepared, the adhesive surface is repeatedly stickable without residual adhesive. In this embodiment, an adhesive layer 51 is disposed on a surface of the temporary adhesive layer 50 to form the adhesive surface. The adhesive layer 51 enables the temporary adhesive layer 50 to be repeatedly stickable and the adhesive of the adhesive layer 51 will not adhere to the lettering layer 30. The adhesive layer 51 of the temporary adhesive layer 50 is attached to the first surface 31 of the lettering layer 30, whereby the lettering layer 30 is adhered to the temporary adhesive layer 50, and the adhesive layer 51 is such adhesive that after the temporary adhesive layer 50 is separated from the lettering layer 30, the lettering layer 30 can be still repeatedly attached to the adhesive layer 51 of the temporary adhesive layer 50. When the lettering layer 30 is separated from the temporary adhesive layer 50, the adhesive of the adhesive layer 51 will not transfer or adhere to the surface of the lettering layer 30. That is, the surface of the lettering layer 30 will not have any residual adhesive of the adhesive layer 51. The temporary adhesive layer 50 is adhered to the lettering layer 30 to form the product of the cuttable lettering film 10 of the present invention as shown in FIG. 4.

Figure 6:
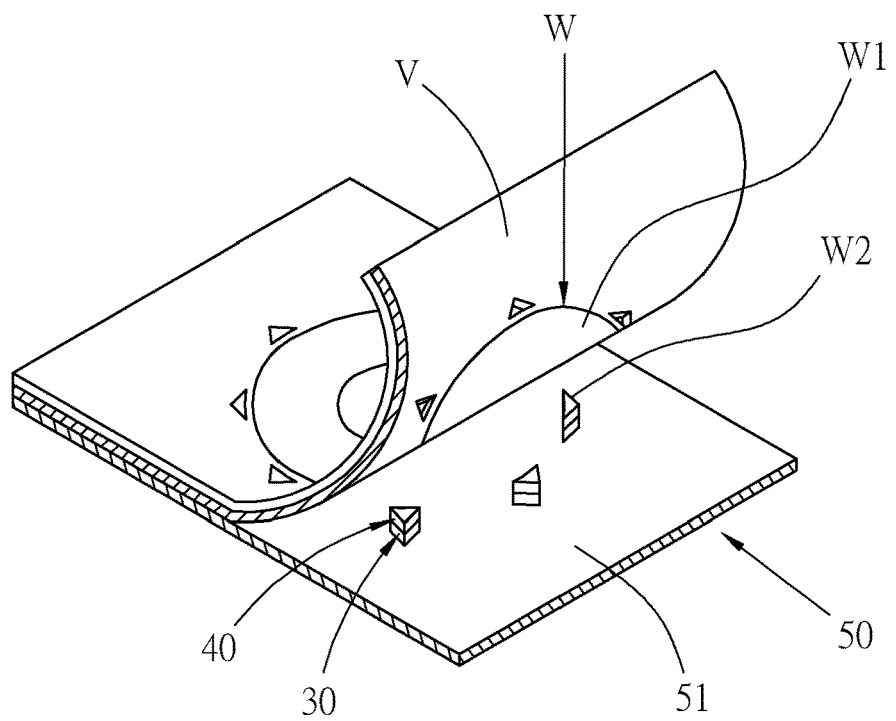
FIG. 6 is a perspective view showing that the unnecessary part excluding the pattern is removed.
Figure 7:
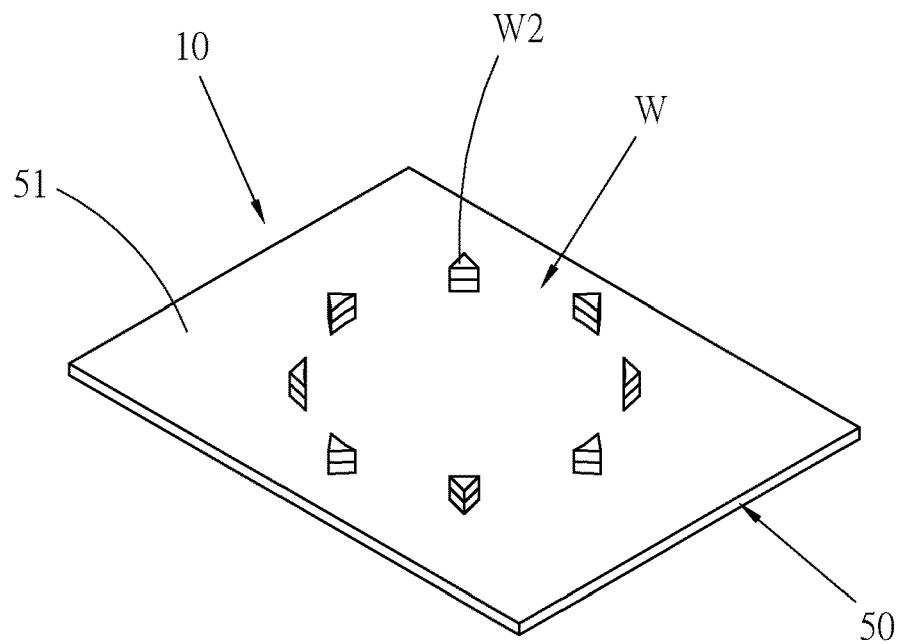
FIG. 7 is a perspective view showing that a part of the pattern is peeled off along with the unnecessary part to cause incompleteness of the pattern.
Figure 8:
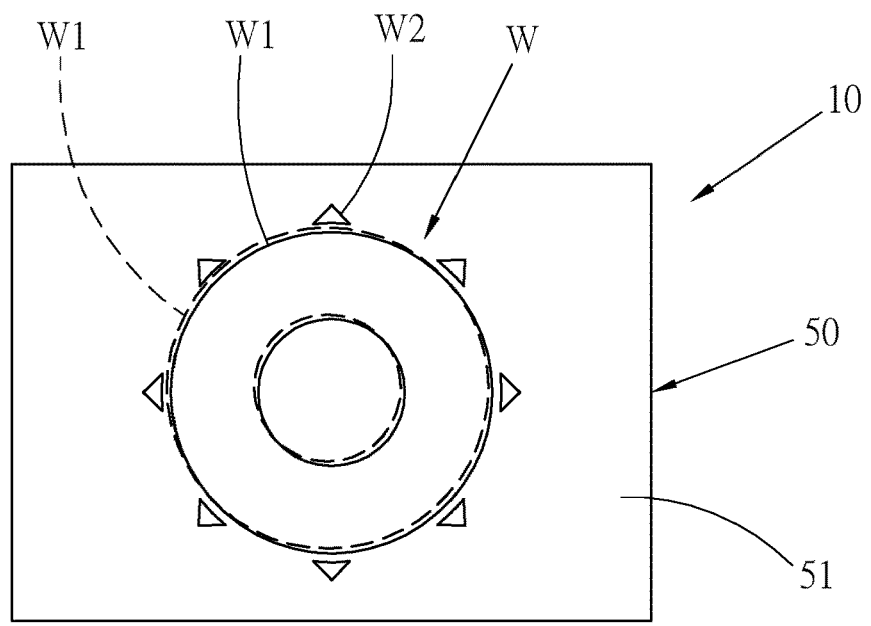
FIG. 8 is a plane view showing that the incautiously peeled off part of the pattern is adhered back to the temporary adhesive layer and the arrangement of the pattern can be adjusted.

When a user desires to adhere a pattern (a figure or a character) onto an article, as shown in FIG. 5, a cutting tool U is used to cut the lettering film 10 to form the pattern, the lettering film 10 is cut from the side of the thermo-bonding layer 40 to form the pattern W. In this embodiment, the pattern W is composed of a first pattern part W1 and a second pattern part W2 as an example, the cutting depth D is such that the thermo-bonding layer 40 and the lettering layer 30 are cut off without cutting off the temporary adhesive layer 50 (as shown in FIG. 4). After cut, the unnecessary part V excluding the pattern W is removed, whereby the pattern W is adhered to the temporary adhesive layer 50 as shown in FIG. 9. Please refer to FIGS. 6 and 7, when the user removes the unnecessary part V excluding the pattern W, incase the pattern W is incautiously partially removed, for example, the first pattern part W1 is peeled off from the temporary adhesive layer 50 along with the unnecessary part V as shown in FIG. 7, due to the adhesive layer 51 of the temporary adhesive layer 50 is repeatedly stickable so that the consumer can again adhere the first pattern part W1 that is incautiously removed back to the adhesive surface (the adhesive layer 51) of the temporary adhesive layer 50 to recover a complete pattern W as shown in FIG. 9. In addition, as shown in FIG. 8, the temporary adhesive layer 50 is repeatedly stickable so that the user can adjust the position of the first pattern part W1 or the second pattern part W2, this facilitates the adjustment and arrangement of the pattern W.

The temporary adhesive layer 50 of the lettering film of the present invention enables the lettering layer 30 to be repeatedly stickable for adhering and locating the pattern, so that in case the first pattern part W1 or the second pattern part W2 that is cut is incautiously peeled off, the first pattern part W1 or the second pattern part W2 can be again adhered back to and located on the temporary adhesive layer 50 to recover the complete pattern W.

Figure 11:
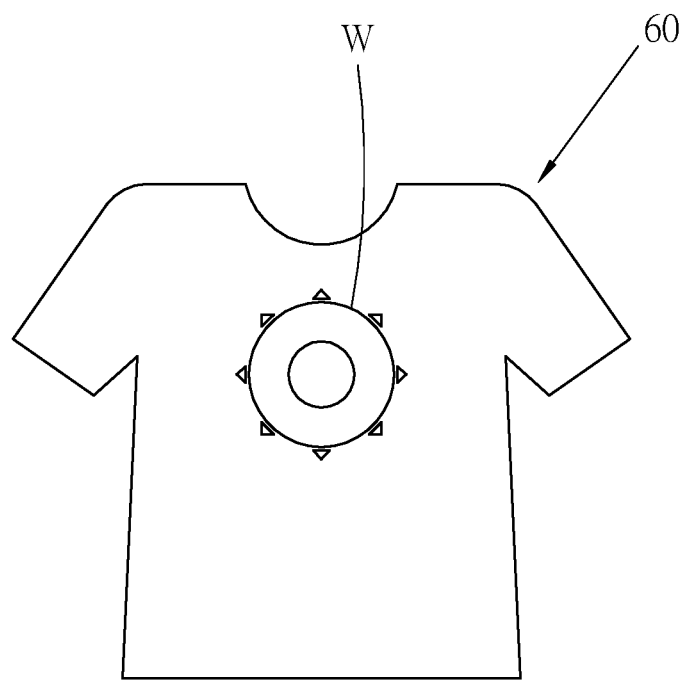
FIG. 11 is a view showing that the pattern cut from the lettering film is adhered to an article.

Please now refer to FIGS. 10 and 11, the pattern W of the lettering film 10 can be stuck on the surface of an article 60 such as a clothes. The thermo-bonding layer 40 contacts the surface of the article 60, then, an iron or a heating apparatus is used to apply thermal energy to the pattern W cut from the lettering film 10 from the side of the temporary adhesive layer 50, the thermo-bonding layer 40 on the bottom of the pattern W is heated and molten to form an adhesive for adhering to the article 60. Accordingly, the pattern W of the lettering film 10 is adhered to the surface of the article 60, then the temporary adhesive layer 50 is peeled off so that the surface of the article has the pattern W.

Figure 12:
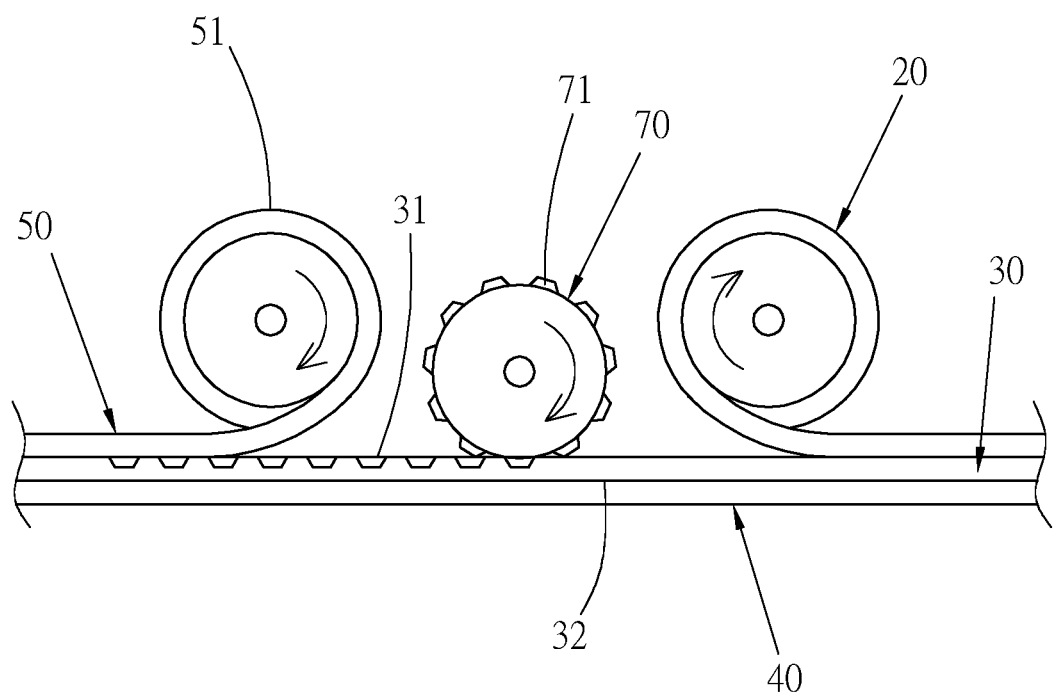
FIG. 12 is a view showing another embodiment of the manufacturing method of the lettering film of the present invention.

Please now refer to FIG. 12. In a second embodiment of the manufacturing method of the present invention, the stripes are formed on the first surface 31 of the lettering layer by another means. In this embodiment, the lettering layer 30 can be formed on any release carrier body with release effect, such as the release film 20. After the lettering layer 30 is separated from the release carrier body, an embossing block 70 with an embossing surface 71 is pressed against the first surface 31 of the lettering layer 30 to form stripes or recessed/raised stripes on the first surface 31. In this embodiment, the embossing block 70 is a roller so that the stripes of the embossing surface 71 of the embossing block 70 can be circulated and repeatedly presented. Then the temporary adhesive layer 50 is attached to the first surface 31 of the lettering layer 30, while the thermo-bonding layer 40 is disposed on the second surface 32 of the lettering layer 30. The thermo-bonding layer 40 can be bonded with the lettering layer before or after the lettering layer 30 is adhered to the temporary adhesive layer 50.

The present invention provides a repeatedly stickable temporary adhesive layer 50 for the lettering film 10, the pattern W cut from the lettering film 10 can be repeatedly adhered to and located on the temporary adhesive layer 50. Therefore, the shortcoming that the pattern is incautiously peeled off and the pattern is incomplete and unusable can be eliminated. Even if the pattern of the lettering film is peeled off, the pattern can be still re-adhered back to the temporary adhesive layer 50, this facilitates use of the lettering film 10.

According to the present invention, the lettering film and the pattern thereof can be many times repeatedly adhered to the temporary adhesive layer 50 without any residual adhesive of the temporary adhesive layer 50 remaining on the lettering layer 30. The present invention enables a user to DIY cut the lettering film into a desired pattern. In case the pattern is incautiously peeled off, the consumer can again adhered the pattern back to the temporary adhesive layer 50 to recover the complete pattern. Then the pattern can be stuck on an article (such as a clothes).

The above embodiments are only used to illustrate the present invention, not intended to limit the scope thereof. Many modifications of the above embodiments can be made without departing from the spirit of the present invention.

What is claimed is:

1. A restickable lettering film comprising:
   a temporary adhesive layer, the temporary adhesive layer having an adhesive surface, the adhesive surface of the temporary adhesive layer is restickable;
   a lettering layer having a first surface and a second surface, the first surface of the lettering layer being adhered to the adhesive surface of the temporary adhesive layer, and the lettering layer is selectively and repeatedly removed from and adhered to the temporary adhesive layer; and
   a thermo-bonding layer disposed on the second surface of the lettering layer, the thermo-bonding layer becoming adhesive when heated.

2. The lettering film as claimed in claim 1, wherein at least one pattern is cut from the lettering film, the cutting depth of the pattern being such that the thermo-bonding layer and the lettering layer are cut off, the pattern can be repeatedly removed from and adhered to the temporary adhesive layer.

3. The lettering film as claimed in claim 2, wherein the adhesive surface of the temporary adhesive layer is repeatedly stickable without residual adhesive.

4. The lettering film as claimed in claim 1, wherein an adhesive layer is disposed on a surface of the temporary adhesive layer to form the adhesive surface.

5. The lettering film as claimed in claim 4, wherein the adhesive surface of the temporary adhesive layer is repeatedly stickable without residual adhesive.

6. The lettering film as claimed in claim 1, wherein the adhesive surface of the temporary adhesive layer is repeatedly stickable without residual adhesive.

7. The lettering film as claimed in claim 1, wherein the first surface of the lettering layer has visible stripes.

8. The lettering film as claimed in claim 1, wherein the material of the lettering layer is rubber, silicone, polyurethane or thermoplastic polyurethane.

9. The lettering film as claimed in claim 1, wherein at least one pattern is cut from the lettering film, the adhesive surface of the temporary adhesive layer enables the at least one pattern to be repeatedly stickable for adhering and locating the at least one pattern on the temporary adhesive layer.

* * * * *